United States Patent
Roesler et al.

(10) Patent No.: US 6,833,423 B2
(45) Date of Patent: Dec. 21, 2004

(54) MOISTURE-CURABLE, POLYETHER URETHANES WITH REACTIVE SILANE GROUPS AND THEIR USE AS SEALANTS, ADHESIVES AND COATINGS

(75) Inventors: Richard R. Roesler, Wexford, PA (US); Derek L. Crawford, Oakdale, PA (US); Kurt C. Frisch, Upper St. Clair, PA (US); Dinesh Pethiyagoda, Pittsburgh, PA (US); Karsten Danielmeier, Solingen-Burg (DE)

(73) Assignee: Bayer Polymers LLC, Pittsburgh, PA (US)

( * ) Notice: Subject to any disclaimer, the term of this patent is extended or adjusted under 35 U.S.C. 154(b) by 44 days.

(21) Appl. No.: 10/690,954

(22) Filed: Oct. 22, 2003

(65) Prior Publication Data

US 2004/0127671 A1 Jul. 1, 2004

Related U.S. Application Data

(63) Continuation-in-part of application No. 10/174,039, filed on Jun. 18, 2002, now abandoned.

(51) Int. Cl.$^7$ .............................................. C08G 77/24
(52) U.S. Cl. ........................... 528/33; 528/26; 528/28; 528/29
(58) Field of Search ............................ 528/26, 28, 29, 528/33

(56) References Cited

U.S. PATENT DOCUMENTS

| | | | |
|---|---|---|---|
| 4,857,623 A | 8/1989 | Emmerling et al. | 528/28 |
| 5,227,434 A | 7/1993 | Katz | 525/419 |
| 5,364,955 A | 11/1994 | Zwiener et al. | 556/418 |
| 5,554,709 A | 9/1996 | Emmerling et al. | 528/27 |
| 5,990,257 A | 11/1999 | Johnston et al. | 528/28 |
| 6,077,902 A * | 6/2000 | Roesler et al. | 524/589 |
| 6,197,912 B1 | 3/2001 | Huang et al. | 528/28 |
| 6,265,517 B1 | 7/2001 | Stuart | 528/28 |
| 6,444,325 B1 * | 9/2002 | Roesler et al. | 428/447 |
| 6,545,087 B1 | 4/2003 | Schmalstieg et al. | 525/38 |

FOREIGN PATENT DOCUMENTS

| | | |
|---|---|---|
| CA | 2325552 | 9/1999 |
| EP | 0 372 561 | 6/1990 |
| EP | 0 546 310 | 6/1993 |
| WO | 98/18843 | 5/1998 |
| WO | 02/06367 | 1/2002 |

* cited by examiner

*Primary Examiner*—Margaret G. Moore
(74) *Attorney, Agent, or Firm*—Joseph C. Gil; Gary F. Matz

(57) ABSTRACT

A moisture curable, alkoxysilane-functional polyether urethanes containing a) 20 to 90% by weight, of a polyether urethane containing two or more reactive silane groups and polyether segments having a number average molecular weight (Mn) of at least 3000 and a degree of unsaturation of less than 0.04 milliequivalents/g, where the sum of Mn of the polyether segments averages 6000 to 20,000, and the reactive silane groups are incorporated by reaction of an isocyanate-reactive group with a compound of formula

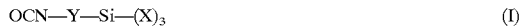

OCN—Y—Si—(X)$_3$ (I)

b) 10 to 80% by weight, of a polyether urethane containing one reactive silane group and one or more polyether segments having Mn of 1000 to 15,000, where the reactive silane groups are incorporated by the reaction of an isocyanate group with a compound of formula

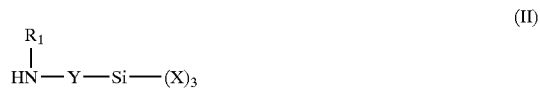

(II)

$R_1$
|
HN—Y—Si—(X)$_3$

17 Claims, No Drawings

US 6,833,423 B2

1

MOISTURE-CURABLE, POLYETHER URETHANES WITH REACTIVE SILANE GROUPS AND THEIR USE AS SEALANTS, ADHESIVES AND COATINGS

CROSS REFERENCE TO RELATED PATENT APPLICATION

This application is a Continuation-In-Part of U.S. Ser. No. 10/174,039, filed Jun. 18, 2002 now abandoned.

FIELD OF THE INVENTION

The present invention relates to moisture-curable urethanes containing reactive silane groups and prepared from polyether polyols having a low degree of unsaturation and to the use of these polyurethanes as sealants, adhesives and coatings.

BACKGROUND OF THE INVENTION

Polyether urethanes containing reactive silane groups, also referred to as silane-terminated polyurethanes (STPs), and their use as sealants and adhesives is known and described, e.g., in U.S. Pat. Nos. 5,554,709; 4,857,623; 5,227,434 and 6,197,912; and WO 02/06367. The silane-terminated polyurethanes may be prepared by various methods. In one method the silane-terminated polyurethanes are prepared by reacting diisocyanates with polyether polyols to form isocyanate-terminated prepolymers, which are then reacted with aminosilanes to form the silane-terminated polyurethanes. The sealants may also be prepared by reacting unsaturated monools with diisocyanates to form intermediates containing unsaturated end groups and then converting these unsaturated groups to alkoxysilane groups by hydrosilylation. In another method the sealants are prepared in one step by the reaction of polyether diols with isocyanatosilanes.

To be useful as sealants the silane-terminated polyurethanes should have a number average molecular weight of 6000 to 20,000. One method of obtaining this molecular weight is to use polyether diols prepared by the KOH process and having a molecular weight of 2000 to prepare the isocyanate-terminated prepolymers. The presence of urethane groups causes the products to have a high viscosity. To achieve suitable application viscosities, the high viscosity is reduced by the addition of higher amounts of plasticizer and lesser amounts of fillers, resulting in more expensive sealant products.

Another method of obtaining high molecular weight sealants is by using high molecular weight polyether diols having a low degree of unsaturation and prepared using special catalysts as described in EP-A 0,546,310, EP-A 0,372,561 and DE-A 19,908,562. When these polyether diols are used, the resulting sealants have excellent tensile strength, but the sealants are too brittle for many applications because the elongation is too low and the 100% modulus is too high.

It is an object of the present invention to provide polyether urethanes that have reactive silane groups and are suitable for use as sealants, adhesives and coatings which possess high tensile strengths and elongations and have a reduced 100% modulus when compared with existing products.

This object may be achieved with the polyether urethanes containing reactive silane groups according to the present invention. These polyether urethanes contain a mixture of polyether urethanes containing two or more reactive silane groups with polyether urethanes containing one reactive

2 silane group. The polyether urethanes containing two or more reactive silane groups are prepared from high molecular weight polyether polyols having a low degree of unsaturation and the reactive silane groups are incorporated by the use of isocyanatosilanes. In the polyether urethanes containing one reactive silane group, the reactive silane groups are incorporated by the use of secondary aminofunctional silanes.

The silane-terminated polyether urethanes according to the invention are suitable for the preparation of sealants or adhesives that have higher tensile strengths and elongations and lower 100% moduli. Due to the fact that these polyether urethanes have a low viscosity, sealant compositions can be formulated with less of the more expensive plasticizers and more of the less expensive fillers, resulting in less expensive sealants.

The preparation of sealants from mixtures of polyfunctional and monofunctional silane-terminated polyurethanes is known and disclosed in U.S. Pat. Nos. 5,554,709 and 4,857,623 and WO 02/06367. However, these references do not disclose the use of polyether polyols having a low degree of unsaturation and aspartate-functional silanes to prepare the sealants.

The preparation of silane-terminated polyether urethanes from aspartate-functional silanes is disclosed in U.S. Pat. No. 5,364,955 and WO 98/18843. In both of these references the polyethers used to prepare polyether urethanes do not have a low degree of unsaturation. In addition, mixtures of polyfunctional and monofunctional silane-terminated polyurethanes are not disclosed. Finally, in the latter reference the polyethers must contain 15 to 40% by weight of ethylene oxide units.

WO 00/26271 discloses the preparation of silane-terminated polyether urethanes from polyether polyols having a low degree of unsaturation and aspartate-functional silanes. The products are prepared by reacting diisocyanates with high molecular weight polyether diols to form NCO prepolymers, which are then capped with aspartate-functional silanes to form silane-terminated polyether urethanes. This application does not disclose mixtures of disilane-terminated polyether urethanes with polyether urethanes containing one reactive silane group.

U.S. Pat. No. 6,265,517 describes a similar process for preparing silane-terminated polyether urethanes from polyether polyols having a low degree of unsaturation and aspartate-functional silanes. The patent requires the starting polyol to have a monool content of less than 31 mole %, and teaches that a relatively high monool content is highly undesirable because monools react with isocyanates thereby reducing crosslinking and curing of the prepolymer. The patent also requires the aspartate silanes to be prepared from dialkyl maleates in which the alkyl groups each contain more than four carbon atoms.

EP 0,372,561 discloses polyether urethanes containing reactive silane groups and prepared from polyether polyols having a low degree of unsaturation. In addition, polyether urethanes containing one reactive silane group are disclosed. This application fails to recognize the necessity of using secondary amino-functional silanes to incorporate reactive silane groups into the polyether urethane containing one reactive silane group.

Copending applications Ser. Nos. 10/160,463, 10/173,919, 10/160,479 and 10/160,364, disclose alkoxysilane-functional polyether urethanes containing a mixture of polyether urethanes containing two or more reactive silane groups with polyether urethanes containing one reactive silane group. The polyether urethanes containing two or more reactive silane groups are prepared from high molecular weight polyether polyols having a low degree of unsaturation.

SUMMARY OF THE INVENTION

The present invention relates to moisture curable, alkoxysilane-functional polyether urethanes containing a) 20 to 90% by weight, based on the weight of a) and b), of a polyether urethane containing two or more reactive silane groups and one or more polyether segments, wherein the polyether segments have a number average molecular weight of at least 3000 and a degree of unsaturation of less than 0.04 milliequivalents/g, provided that the sum of the number average molecular weights of all of the polyether segments per molecule averages 6000 to 20,000, and wherein the reactive silane groups are incorporated by the reaction of an isocyanate-reactive group with a compound corresponding to the formula $$ONC-Y-Si-(X)_3 \qquad (I)$$

wherein
X represents identical or different organic groups which are inert to isocyanate groups below 100° C., provided that at least two of these groups are alkoxy or acyloxy groups and
Y represents a linear or branched alkylene group containing 1 to 8 carbon atoms, and b) 10 to 80% by weight, based on the weight of a) and b), of a polyether urethane containing one reactive silane group and one or more polyether segments having a number average molecular weight of 1000 to 15,000, wherein the reactive silane groups are incorporated by the reaction of an isocyanate group with a compound corresponding to the formula

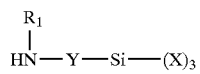

(II)

wherein
$R_1$ represents an organic group which is inert to isocyanate groups at a temperature of 100° C. or less.

The present invention also relates to sealant, adhesive and coating compositions containing these polyether urethanes.

DETAILED DESCRIPTION OF THE INVENTION

In the moisture-curable, polyether urethanes according to the present invention polyether urethanes a) are present in a minimum amount of 20% by weight, preferably 30% by weight and more preferably 40% by weight. The maximum amount of polymers a) is 90% by weight, preferably 80% by weight and more preferably 70% by weight. Polyether urethanes b) are present in a minimum amount of at least 10% by weight, preferably 20% by weight and more preferably 30% by weight. The maximum amount of polymers b) is 80% by weight, preferably 70% by weight and more preferably 60% by weight. The preceding percentages are based on the total weight of polyether urethanes a) and b).

Suitable polymers for use as component a) include polyether urethanes containing one or more, preferably one, polyether segment 20 having a number average molecular weight of 3000 to 20,000, preferably 6000 to 15,000 and more preferably 8000 to 12,000. When the polyether segments have a number average molecular weight of 3000, for example, then two or more of these segments must be present so that the number average molecular weights of all of the polyether segments per molecule averages 6000 to 20,000. Polymers a) also contain two or more, preferably two reactive silane groups. The reactive silane groups are incorporated by the reaction of an isocyanate-reactive group with an isocyanatosilane corresponding to formula I.

In accordance with the present invention the term "reactive silane group" means a silane group containing at least two alkoxy or acyloxy groups as defined by substituent "X". A silane group containing two or three alkoxy and/or acyloxy groups is considered to be one reactive silane group. Also, a urethane is a compound containing one or more urethane and/or urea groups. These compounds preferably contain one or more urethane groups and may optionally contain urea groups. More preferably, these compounds contain both urethane and urea groups.

Polymers a) may be prepared by several methods. For example, they may be prepared by reacting a high molecular weight polyether containing at least two isocyanate-reactive groups, preferably hydroxyl groups, with an isocyanatosilane corresponding to formula I, to form polymers a). This method is preferred in accordance with the present invention because polymers a) are directly formed with a minimum amount of connecting groups, e.g., urethane or urea groups.

Indirect methods for forming polymers a) are also suitable. For example, the isocyanatosilane may be reacted with an equimolar amount of a compound containing two isocyanate-reactive groups, such as a diol or a diamine, to form a intermediate compound containing one isocyanate-reactive group. The intermediate compound may then be reacted with an NCO prepolymer prepared by reacting an excess of a polyisocyanate, preferably a diisocyanate, with the previously described high molecular weight polyether. These NCO prepolymers are described in copending application, Ser. No. 10/690,955, herein incorporated by reference. The indirect methods are less preferred since they introduce a greater number of connecting groups, which can substantially increase the viscosity of polyether urethanes a).

Suitable isocyanatosilanes are those corresponding to formula I $$ONC-Y-Si-(X)_3 \qquad (I)$$

wherein
X represents identical or different organic groups which are inert to isocyanate groups below 100° C., provided that at least two of these groups are alkoxy or acyloxy groups, preferably alkyl or alkoxy groups having 1 to 4 carbon atoms and more preferably alkoxy groups and
Y represents a linear or branched alkylene group containing 1 to 8 carbon atoms, preferably a linear group containing 2 to 4 carbon atoms or a branched group containing 5 to 6 carbon atoms, more preferably a linear group containing 3 carbon atoms.

Especially preferred are compounds in which X represents methoxy, ethoxy groups or propoxy groups, more preferably methoxy or ethoxy groups, and Y is a linear group containing 3 carbon atoms. Examples of suitable isocyanatosilanes include 3-isocyanatopropyl-methyldimethoxysilane, 3-isocyanatopropyl-trimethoxysilane and 3-isocyanatopropyl-triethoxysilane. 3-isocyanatopropyl-trimethoxysilane (Silquest Y-5187, available from OSI Corporation) is especially preferred.

Suitable polyols for preparing polymers a) are polyether polyols, preferably diols, having a number average molecular weight of at least 3000, in some cases at least 6000 and in other cases at least 8000. Also, the number average molecular weight of the polyether polyol can be up to 20,000, in some cases up to 15,000 and in other cases up to 12,000. The number average molecular weight of the polyether polyol can vary and range between any of the values recited above.

The polyethers have a maximum total degree of unsaturation of 0.1 milliequivalents/g (meq/g) or less, in some cases less than 0.04 (meq/g) in other cases less than 0.02 meq/g, in some situations less than 0.01 meq/g, in other situations 0.007 meq/g or less, and in particular situations 0.005 meq/g or less. The amount of unsaturation will vary depending on the method used to prepare the polyether as well as the molecular weight of the polyether. Such polyether diols are known and can be produced by, as a non-limiting example, the propoxylation of suitable starter molecules. As another non-limiting example, minor amounts (up to 20% by weight, based on the weight of the polyol) of ethylene oxide can be used. If ethylene oxide is used, it is preferably used as the initiator for or to cap the polypropylene oxide groups. Non-limiting examples of suitable starter molecules include diols such as ethylene glycol, propylene glycol, 1,3-butanediol, 1,4-butanediol, 1,6 hexanediol and 2-ethylhexanediol-1,3. Also suitable are polyethylene glycols and polypropylene glycols.

Suitable methods for preparing polyether polyols are known and are described, for example, in EP-A 283 148, U.S. Pat. Nos. 3,278,457, 3,427,256, 3,829,505, 4,472,560, 3,278,458, 3,427,334, 3,941,849, 4,721,818, 3,278,459, 3,427,335 and 4,355,188. They are preferably prepared using double metal cyanides as catalysts.

In addition to the polyether polyols, minor amounts (up to 20% by weight, based on the weight of the polyol) of low molecular weight dihydric and trihydric alcohols having a molecular weight 32 to 500 can also be used. Suitable examples include ethylene glycol, 1,3-butandiol, 1,4-butandiol, 1,6-hexandiol, glycerine or trimethylolpropane. However, the use of low molecular weight alcohols is less preferred.

It is also possible in accordance with the present invention to use aminopolyethers instead of the polyether polyols. The aminopolyethers may be prepared by aminating the corresponding polyether polyols in known manner.

Similarly to polymers a), polymers b) also contain one or more polyether segments, but they only contain one reactive silane group. Polymers b) may be prepared by several methods. For example, they may be prepared by reacting a high molecular weight polyether containing one isocyanate-reactive group, preferably a hydroxyl group, with an excess of a polyisocyanate, preferably a diisocyanate. The amount of the isocyanate and polyether is chosen such that the resulting product contains one isocyanate group.

For example, when reacting a diisocyanate with a monool using equimolar mixtures of the reactants, the resulting product contains an average of one isocyanate group. In addition to the monoisocyanate intermediate, which is the 1/1 adduct of the monool and diisocyanate, the reaction mixture also contains minor amounts of non-functional polymers c), which are formed by the reaction of two molecules of the monool with one molecule of the diisocyanate. The reaction mixture may also contain a minor amount of unreacted diisocyanate, which can be removed, e.g., by distillation, or which can remain in the reaction mixture.

In accordance with the present invention it is also possible to react additional quantities of the monool with the diisocyanate. When the reaction is carried out in this manner, additional amounts of non-functional polymers c) are formed. These polymers remain in the reaction mixture and function as plasticizers during the subsequent use of the moisture-curable, polyether urethanes according to the invention.

The reaction mixture containing the monoisocyanate intermediate is reacted with a compound containing an isocyanate-reactive group, preferably an -NH group, and one or more, preferably one reactive silane group to form polyether urethane b). The reaction mixture also contains polymers d), which are the reaction products of any monomeric diisocyanates present in the reaction mixture with the isocyanate-reactive silanes. Polymers d) are considered a part of polyether urethane b), even though they contain two reactive silane groups.

Non-functional polymers c) are preferably present in an amount of less than 60% by weight, more preferably less than 30% by weight and most preferably less than 10% by weight, based on the weight of polyether urethane b). When polymers c) are present, they are preferably present in an amount of at least 0.1% by weight, more preferably at least 0.5% by weight.

Polymers d) are preferably present in an amount of less then 2% by weight, more preferably less than 1% by weight, based on the weight of polyether urethane b). When polymers d) are present, they are preferably present in an amount of at least 0.1% by weight and more preferably at least 0.5% by weight, based on the weight of polyether urethane a).

Polymers b) may also be prepared by reversing these steps and reacting an excess of a polyisocyanate with an isocyanate-reactive silane and then reacting the resulting intermediate with the high molecular weight polyether. Mixtures of polymers b), c) and e) will also be formed when the process steps are carried out in this order.

Suitable polyisocyanates which may be used to prepare polymers b) are known and include monomeric organic diisocyanates represented by the formula, $R(NCO)_2$, in which R represents an organic group obtained by removing the isocyanate groups from an organic diisocyanate having a molecular weight of 112 to 1,000, preferably 140 to 400. Preferred diisocyanates are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanato-cyclohexyl)-methane, 1,3- and 1,4-bis-(isocyanatomethyl)-cyclohexane, bis-(4-isocyanatocyclo-hexyl)-methane, 2,4'-diisocyanato-dicyclohexyl methane, bis-(4-isocyanato-3-methyl-cyclohexyl)-methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-hexahydro-toluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof.

Monomeric polyisocyanates containing 3 or more isocyanate groups such as 4-isocyanatomethyl-1,8-octamethylene diisocyanate and aromatic polyisocyanates such as 4,4',4''-triphenylmethane triisocyanate and polyphenyl polymethylene polyisocyanates obtained by phosgenating aniline/formaldehyde condensates may also be used. Also suitable, although less preferred, are polyisocyanate adducts prepared from the preceding monomeric polyisocyanates and containing isocyanurate, uretdione, biuret, urethane, allophanate, iminooxadiazine dione, carbodiimide and/or oxadiazinetrione groups.

Preferred diisocyanates include bis-(4-isocyanatocyclohexyl)methane, 1,6-hexamethylene diisocyanate, isophorone diisocyanate, α,α,α',α'-tetramethyl-1,3- and/or -1,4-xylylene diisocyanate, 2,4- and/or 2,6-toluylene diisocyanate, and 2,4- and/or 4,4'-diphenylmethane diisocyanate. Especially preferred are isophorone diisocyanate, 2,4-toluylene diisocyanate and mixtures of 2,4- and 2,6-toluylene diisocyanate.

Also suitable for preparing polymers b) are the difunctional NCO prepolymers previously set forth for preparing polymers a) by the indirect process. If the NCO prepolymer contains high molecular weight polyether segments, then low molecular monools can also be used to prepare the previously described monoisocyanate intermediates.

Suitable monools for preparing polymers b) are polyether monools having a number average molecular weight of 1000 to 15,000, preferably 3000 to 12,000 and more preferably 6000 to 12,000. The polyether monools are prepared by the alkoxylation of monofunctional starting compounds with alkylene oxides, preferably ethylene oxide, propylene oxide or butylene oxide, more preferably propylene oxide. If ethylene oxide is used, it is used in an amount of up to 40% by weight, based on the weight of the polyether. The polyethers are preferably prepared either by the KOH process or by mixed metal cyanide catalysis. The latter process results in products with low a degree of unsaturation.

Preferably, the polyethers have a maximum total degree of unsaturation of 0.1 milliequivalents/g (meq/g) or less, in some cases less than 0.04 (meq/g) in other cases less than 0.02 meq/g, in some situations less than 0.01 meq/g, in other situations 0.007 meq/g or less, and in particular situations 0.005 meq/g or less. The amount of unsaturation will vary depending on the method used to prepare the polyether as well as the molecular weight of the polyether. These polyether monools are known and can be produced by the methods set forth previously for preparing the polyether polyols, as a non-limiting example by the propoxylation of suitable starter molecules. In another non-limiting example, minor amounts (up to 20% by weight, based on the weight of the polyol) of ethylene oxide can also be used. As with the polyethers a–i), if ethylene oxide is used, it can be used as the initiator for or to cap the polypropylene oxide groups.

Examples of suitable starter molecules include aliphatic, cycloaliphatic and araliphatic alcohols, phenol and substituted phenols, such as methanol, ethanol, the isomeric propanols, butanols, pentanols and hexanols, cyclohexanol and higher molecular weight compounds such as nonylphenol, 2-ethylhexanol and a mixture of $C_{12}$ to $C_{15}$, linear, primary alcohols (Neodol 25, available from Shell). Also suitable are unsaturated alcohols such as allyl alcohol; and hydroxy functional esters such as hydroxyethyl acetate and hydroxyethyl acrylate. Preferred are the higher molecular weight monohydroxy compounds, especially nonyl phenol and mixtures of $C_{12}$ to $C_{15}$, linear, primary alcohols.

It is also possible in accordance with the present invention to use monoaminopolyethers instead of the polyether monools. These aminopolyethers may be prepared by aminating the corresponding polyether monools in known manner.

Suitable isocyanate-reactive silanes for use in preparing polymers b) include those corresponding to the formula

(II)

wherein

X and Y are as previously defined and $R_1$ represents an organic group which is inert to isocyanate groups at a temperature of 100° C. or less, preferably an alkyl, cycloalkyl or aromatic group having 1 to 12 carbon atoms and more preferably an alkyl, cycloalkyl or aromatic group having 1 to 8 carbon atoms.

Examples of suitable aminoalkyl alkoxysilanes and aminoalkyl acyloxysilanes of formula IV, which contain secondary amino groups, include N-phenylaminopropyl-trimethoxysilane (available as A-9669 from OSI Corporation), N-cyclohexylaminopropyl-triethoxysilane, N-methyl-aminopropyl-trimethoxysilane, N-butylaminopropyl-trimethoxysilane, N-butylaminopropyl-triacyloxysilane, 3-(N-ethyl)amino-2-methylpropyl-trimethoxysilane, 4-(N-ethyl)amino-3,3-dimethylbutyl-trimethoxysilane and the corresponding alkyl diethoxy, alkyl dimethoxy and alkyl diacyloxy-silanes, such as 3-(N-ethyl)amino-2-methylpropyl-methyldimethoxysilane.

A special group of compounds containing alkoxysilane groups and corresponding to formula II are those containing aspartate groups and corresponding to formula III

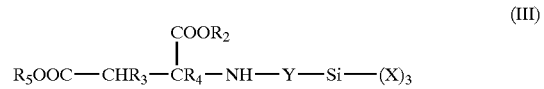

(III)

wherein

X and Y are as previously defined, $R_2$ and $R_5$ are identical or different and represent organic groups which are inert to isocyanate groups at a temperature of 100° C. or less, preferably alkyl groups having 1 to 9 carbon atoms, more preferably alkyl groups having 1 to 4 carbon atoms, such as methyl, ethyl or butyl groups and $R_3$ and $R_4$ are identical or different and represent hydrogen or organic groups which are inert towards isocyanate groups at a temperature of 100° C. or less, preferably hydrogen.

The compounds of formula III are prepared by reacting aminosilanes corresponding to formula IV

(IV)

with maleic or fumaric acid esters corresponding to formula V

(V)

Examples of suitable aminoalkyl alkoxysilanes and aminoalkyl acyloxysilanes corresponding to formula IV include 3-aminopropyl-triacyloxysilane, 3-aminopropyl-methyldimethoxysilane; 6-aminohexyl-tributoxysilane; 3-aminopropyl-trimethoxysilane; 3-aminopropyltriethoxysilane; 3-aminopropyl-methyldiethoxysilane; 5-aminopentyl-trimethoxysilane; 5-aminopentyl-triethoxysilane; 4-amino-3,3-dimethylbutyl-trimethoxysilane and 3-aminopropyl-triisopropoxysilane. 3-aminopropyl-trimethoxysilane and 3-aminopropyl-triethoxysilane are particularly preferred.

Examples of optionally substituted maleic or fumaric acid esters suitable for preparing the aspartate silanes include the dimethyl, diethyl, dibutyl (e.g., di-n-butyl), diamyl, di-2-ethylhexyl esters and mixed esters based on mixture of these and/or other alkyl groups of maleic acid and fumaric acid; and the corresponding maleic and fumaric acid esters substituted by methyl in the 2- and/or 3-position. The dimethyl, diethyl and dibutyl esters of maleic acid are preferred, while the diethyl esters are especially preferred.

The reaction of primary amines with maleic or fumaric acid esters to form the aspartate silanes of formula III is known and described, e.g., in U.S. Pat. No. 5,364,955, which is herein incorporated by reference.

Instead of using an aminosilane, it is also possible to prepare polyether urethanes b) by using the hydroxy compound obtained by reacting a secondary aminosilane with a cyclic carbonate such as ethylene or propylene carbonate.

In accordance with another embodiment of the present invention it is possible to avoid the need for separately preparing a high molecular weight polyether monool by converting a high molecular weight polyether diol into a monool by reacting it with a monoisocyanate. A further alternative for preparing a polyether monool is to react one mole of a diol with a monoacid chloride. Another method for preparing a high molecular weight monool is to react one mole of a monool and one mole of a diol with one mole of a diisocyanate. Either or both of the monool and diol may contain high molecular weight polyether segments. The polyether monools obtained from these processes can then be used to prepare polymers b) using the previously described processes.

If two moles of a diisocyanate are used in the last process, then the resulting product is a monoisocyanate that can be reacted with an isocyanate-reactive compound containing an alkoxysilane group to form polymers b). Another method for forming this monoisocyanate is to react an NCO prepolymer, such as those previously described for preparing polymers a), with a monoalcohol.

The polyether monoamines, which have also been described as suitable for preparing polymers b), can be reacted in the same manner as the polyether monools.

In another embodiment a polyether monool is prepared by the alkoxylation of a hydroxyalkyl (meth)acrylate. The resulting polyether monool is reacted with a monoisocyanate to form an unsaturated intermediate. This intermediate is then reacted with a primary or secondary aminosilane or a thiosilane to incorporate silane groups by a Michael addition.

The compositions of the present invention may be cured in the presence of water or moisture to prepare coatings, adhesives or sealants. The compositions cure by "silane polycondensation" from the hydrolysis of alkoxysilane groups to form Si—OH groups and their subsequent reaction with either Si—OH or Si—OR groups to form siloxane groups (Si—O—Si).

Suitable acidic or basis catalysts may be used to promote the curing reaction. Examples include acids such as para-toluene sulfonic acid; metallic salts such as dibutyl tin dilaurate; tertiary amines such as triethylamine or triethylene diamine; and mixtures of these catalysts. The previously disclosed, low molecular weight, basic aminoalkyl trialkoxysilanes, also accelerate hardening of the compounds according to the invention.

The one-component compositions generally may be either solvent-free or contain up to 70%, preferably up to 60% organic solvents, based on the weight of the one-component composition, depending upon the particular application. Suitable organic solvents include those which are known from either from polyurethane chemistry or from coatings chemistry.

The compositions may also contain known additives, such as leveling agents, wetting agents, flow control agents, antiskinning agents, antifoaming agents, fillers (such as chalk, lime, flour, precipated and/or pyrogenic silica, aluminum silicates and high-boiling waxes), viscosity regulators, plasticizers, pigments, dyes, UV absorbers and stabilizers against thermal and oxidative degradation.

The one-component compositions may be used with any desired substrates, such as wood, plastics, leather, paper, textiles, glass, ceramics, plaster, masonry, metals and concrete. They may be applied by standard methods, such as spraying, spreading, flooding, casting, dipping, rolling and extrusion.

The one-component compositions may be cured at ambient temperature or at elevated temperatures. Preferably, the moisture-curable compositions are cured at ambient temperatures.

The invention is further illustrated but is not intended to be limited by the following examples in which all parts and percentages are by weight unless otherwise specified.

EXAMPLES

The following starting components were used in the examples:
Preparation of Silane Functional Aspartate (SFA 1)
An aspartate resin was prepared according to U.S. Pat. No. 4,364,955. To a 5 liter flask fitted with agitator, thermocouple, nitrogen inlet and addition funnel with condenser were added 1483 g (8.27 equivalents) of 3-aminopropyl-trimethoxysilane (Silquest A-1110, available from OSI Corporation). The addition funnel was used to admit 1423.2 g (8.27 equivalents) of diethyl maleate over a two hour period. The temperature of the reactor was maintained at 25° C. during the addition. The reactor was maintained at 25° C. for an additional five hours at which time the product was poured into glass containers and sealed under a blanket of nitrogen. After one week the unsaturation number was 0.6 indicating the reaction was ~99% complete.
Y-5187
3-isocyanatopropyl-trimethoxysilane (Silquest Y-5187, available from OSI Corporation)
A-1110
3-aminopropyl-trimethoxysilane (Silquest A-1110, available from OSI Corporation)
Hydroxy Polyether 1
A polyoxypropylene diol (Acclaim 12200, unsaturation= 0.007 meq/g, available from Bayer Corporation) having a functionality of 2 and the equivalent weight set forth in Table 1.
Preparation of Hydroxy Polyether 2
Nonylphenol (183 g, 0.89 eq) was charged to a stainless-steel reactor. Zinc hexacyanocobaltate-tert-butyl alcohol complex (0.143 g, prepared as described in U.S. Pat. No. 5,482,908) was added and the mixture was heated with stirring under vacuum at 130° C. for one hour to remove traces of water from the nonylphenol starter. Propylene oxide (5517 g, 125.4 eq) was introduced into the reactor over 6 hours. After the epoxide addition was completed, the mixture was heated to 130° C. until no further pressure decrease occurred. The product was vacuum stripped and then drained from the reactor. The resulting polyether had an OH number of 8.7, an equivalent weight of 6411, unsaturation=0.007 meq/g, and a functionality of 1.

Preparation of Hydroxy Polyether 3

Hydroxy polyether 3 was prepared in the same manner as hydroxy polyether 2 except that 175 g (0.80 eq) of nonylphenol and 5625 g (127.8 eq) of propylene oxide were used. The resulting polyether had an OH number of 7.7, an equivalent weight of 7295, unsaturation=0.009 meq/g, and a functionality of 1.

Preparation of Silane Terminated Polyurethanes (STP) 1-2 from Isocyanatosilanes

A 1 liter round bottom flask was fitted with agitator, nitrogen inlet, condenser, heater and addition funnel. Into the flask were charged the weight of hydroxy polyether and the weight of 3-isocyanatopropyl-trimethoxysilane (Silquest Y-5187, available from OSI Corporation) listed in Table 1 and 0.05 g dibutyltin dilaurate. The reaction was heated to 50° C. for 4 hours until no NCO remained as determined by an IR spectrum. 1.24 g of vinyl trimethoxysilane was added as a moisture scavenger.

Preparation of Silane Terminated Polyurethanes (STP) 3-4 from Aminosilanes

A 5 liter round bottom flask was fitted with agitator, nitrogen inlet, condenser, heater and addition funnel. Into the flask were charged the weight of isophorone diisocyanate (IPDI) and the weight of the hydroxy polyether listed in Table 1 and 0.8 9 dibutyltin dilaurate. The reaction was heated to 60° C. for 3 hours until the theoretical isocyanate content was reached. The weight of the appropriate aminosilane listed in Table 1 was added. The flask was heated at 60° C. for an additional 1 hour until no NCO remained as determined by an IR spectrum. 19.9 g of vinyl trimethoxysilane as added as moisture scavenger.

TABLE 1

| STP # | 1 | 2 | 3 | 4 |
|---|---|---|---|---|
| Hydroxy Polyether | 1 | 2 | 3 | 2 |
|  | diol | monool | monool | monool |
| Equivalent weight | 5817 | 6411 | 7295 | 6411 |
| Charge weight, g | 238.5 | 239.9 | 3682.8 | 330.5 |
| Equivalents | 0.041 | 0.033 | 0.500 | 0.045 |
| IPDI |  |  |  |  |
| Charge weight, g | — | — | 112.0 | 10.0 |
| Equivalents | — | — | 1.010 | 0.090 |
| Silane type | Y-5187 | Y-5187 | SFA 1 | A-1110 |
| Charge weight, g | 11.1 | 8.9 | 185.0 | 8.3 |
| Equivalents | 0.041 | 0.033 | 0.500 | 0.045 |
| Resin Viscosity, mPa · s @ 25 C. | 4,950 | 2,800 | 10,400 | 15,100 |
| Functionality | 2 | 1 | 1 | 1 |

Formulation of Silane Sealants

The STP's were formulated into sealants using the following typical formulation and procedure. The difunctional STP's were formulated alone and in combination with the monofunctional STP's to demonstrate the effects of these combinations.

Procedure

The following is the standard sealant/adhesive formulation and procedure used to formulate all diol and diol/monool blends. Values given for each formula component are percent by weight of the total formula weight. A high-speed centrifugal mixer was used to mix the formulation components in the steps given below. Each mixing period was one minute in length at a speed of 2200 rpm.

Step 1

To a clean dry mixing container were charged the following:
STP (blend) 37.5
Plasticizer 17.5
Adhesion Promoter 0.8
Catalyst 0.1
Desiccant 0.5

The ingredients were mixed for one minute in length at a speed of 2200 rpm.

Step 2

A portion of the filler was added to the mixing container.
Filler 23.6

The ingredients were mixed for one minute at a speed of 2200 rpm.

Step 3

The remaining filler was added to the mixing container.
Filler 20.0

The ingredients were mixed for one minute in length at a speed of 2200 rpm.

Step 4

The side of the mix container was scraped and the ingredients were mixed for one additional minute at a speed of 2200 rpm to incorporate all of the filler into the mixture.

Step 5

The resulting product was degassed at 50° C. and under full vacuum (>28 mm Hg) for one hour. The material was used immediately. Exxon Jayflex DIDP was used as the plasticizer. An aminosilane (Silquest A-1120, available from OSI Corporation) was used as the adhesion promoter. A vinyltrimethoxysilane (Silquest A-171, available from OSI Corporation) was used as the desiccant. The filler used was Specialty Minerals Ultra P Flex precipitated calcium carbonate (mean particle size of 0.07 microns). The catalyst used was dibutyltin dilaurate.

The weight ratios of the diols to monools in the STP portion of the sealant formulations were varied as set forth in the following table. The weight ratios are based on the total weight of the STP's in the formulation.

Cure and Testing of Silane Sealants

The sealant formulations were cast onto 0.25 inch thick polyethylene sheets and cured at standard conditions of 20° C., 50% relative humidity for at least two weeks before testing. Tensile strength, percent elongation and 100% modulus were determined according to ASTM D-412. Die "C" tear strengths were determined according to ASTM D-624. The results are set forth in the following table.

TABLE 2

| Ex. No. | Disilane STP | Mono-silane STP | Disilane/ Mono-silane Ratio | Die-C Tear (lbs/in) | Ultimate Tensile Strength (psi) | Modulus @100% Elongation (psi) | Elonga-tion (%) |
|---|---|---|---|---|---|---|---|
| 1 (Comp) | 1 | — | — | 32 | 292 | 188 | 191 |
| 2 (Comp) | 1 | 2 | 80:20 | 28 | 254 | 203 | 158 |
| 3 (Comp) | 1 | 2 | 60:40 | 25 | 201 | 179 | 141 |
| 4 (Comp) | 1 | 2 | 40:60 | 13 | 140 | 187 | 95 |
| 5 | 1 | 3 | 80:20 | 28 | 262 | 144 | 239 |
| 6 | 1 | 3 | 60:40 | 23 | 216 | 122 | 217 |
| 7 | 1 | 3 | 40:60 | 21 | 169 | 78 | 262 |
| 8 (Comp) | 1 | 4 | 80:20 | 24 | 246 | 164 | 178 |
| 9 (Comp) | 1 | 4 | 60:40 | 19 | 211 | 135 | 180 |
| 10 (Comp) | 1 | 4 | 40:60 | 13 | 157 | 105 | 171 |

The properties set forth in the table demonstrate the advantages obtained for sealants 5–7 according to the invention. These sealants, which contained monofunctional STP's prepared from a secondary aminosilane, provide improved ultimate tensile strengths, much lower moduli at 100% elongation and much higher elongations than comparison sealants 2–4 and 8–10. The comparison sealants contain monofunctional STP's 2 and 4, which were prepared from an isocyanatosilane and a primary aminosilane, respectively.

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A moisture-curable, alkoxysilane-functional polyether urethane comprising a) 20 to 90% by weight, based on the weight of a) and b), of a polyether urethane containing two or more reactive silane groups and one or more polyether segments, wherein the polyether segments have a number average molecular weight of at least 3000 and a degree of unsaturation of less than 0.04 milliequivalents/g, provided that the sum of the number average molecular weights of all of the polyether segments per molecule averages 6000 to 20,000, and wherein the reactive silane groups are incorporated by the reaction of an isocyanate-reactive group with a compound corresponding to the formula $$OCN-Y-Si-(X)_3 \quad (I)$$

wherein
X represents identical or different organic groups which are inert to isocyanate groups below 100° C., provided that at least two of these groups are alkoxy or acyloxy groups and
Y represents a linear or branched alkylene group containing 1 to 8 carbon atoms, and b) 10 to 80% by weight, based on the weight of a) and b), of a polyether urethane containing one reactive silane group and one or more polyether segments having a number average molecular weight of 1000 to 15,000, wherein the reactive silane groups are incorporated by the reaction of an isocyanate group with a

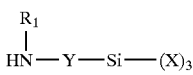

compound corresponding to the formula wherein
$R_1$ represents an organic group which is inert to isocyanate groups at a temperature of 100° C. or less.

2. The polyether urethane of claim 1 wherein
X represents identical or different alkoxy groups having 1 to 4 carbon atoms,
Y represents a linear radical containing 2 to 4 carbon atoms or a branched radical containing 5 to 6 carbon atoms and
$R_1$ represents an alkyl, cycloalkyl or aromatic group having 1 to 12 carbon atoms.

3. The polyether urethane of claim 1 wherein the reactive silane groups of component b) are incorporated as the reaction product of an isocyanate group and a compound corresponding to the formula

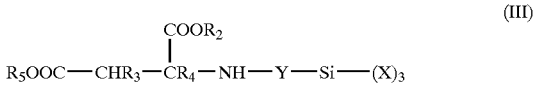

wherein
$R_2$ and $R_5$ are identical or different and represent organic groups which are inert to isocyanate groups at a temperature of 100° C. or less and
$R_3$ and $R_4$ are identical or different and represent hydrogen or organic groups which are inert towards isocyanate groups at a temperature of 100° C. or less.

4. The polyether urethane of claim 1 wherein the reactive silane groups of component b) are incorporated as the reaction product of an isocyanate group and a compound corresponding to the formula

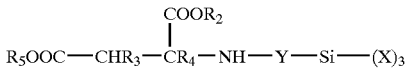

(III)
wherein
X represents identical or different alkyl or alkoxy groups having 1 to 4 carbon atoms,
Y represents a linear radical containing 2 to 4 carbon atoms or a branched radical containing 5 to 6 carbon atoms, $R_2$ and $R_5$ are identical or different and represent alkyl groups having 1 to 4 carbon atoms and $R_3$ and $R_4$ represent hydrogen.

5. The polyether urethane of claim 1 wherein polyether urethane a) is present in an amount of 30 to 80% by weight and polyether urethane b) is present in an amount of 20 to 70% by weight, wherein the percentages are based on the weight of a) and b).

6. The polyether urethane of claim 2 wherein polyether urethane a) is present in an amount of 30 to 80% by weight and polyether urethane b) is present in an amount of 20 to 70% by weight, wherein the percentages are based on the weight of a) and b).

7. The polyether urethane of claim 3 wherein polyether urethane a) is present in an amount of 30 to 80% by weight and polyether urethane b) is present in an amount of 20 to 70% by weight, wherein the percentages are based on the weight of a) and b).

8. The polyether urethane of claim 4 wherein polyether urethane a) is present in an amount of 30 to 80% by weight and polyether urethane b) is present in an amount of 20 to 70% by weight, wherein the percentages are based on the weight of a) and b).

9. The polyether urethane of claim 1 wherein the polyether segments of polyether urethane a) have a number average molecular weight of at least 6000 and the polyether segments of component b) have a number average molecular weight of 3000 to 12,000.

10. The polyether urethane of claim 2 wherein the polyether segments of polyether urethane a) have a number average molecular eight of at least 6000 and the polyether segments of component b) have a number average molecular weight of 3000 to 12,000.

11. The polyether urethane of claim 3 wherein the polyether segments of polyether urethane a) have a number average molecular weight of at least 6000 and the polyether segments of component b) have a number average molecular weight of 3000 to 12,000.

12. The polyether urethane of claim 4 wherein the polyether segments of polyether urethane a) have a number average molecular weight of at least 6000 and the polyether segments of component b) have a number average molecular weight of 3000 to 12,000.

13. The polyether urethane of claim 5 wherein the polyether segments of polyether urethane a) have a number average molecular weight of at least 6000 and the polyether segments of component b) have a number average molecular weight of 3000 to 12,000.

14. The polyether urethane of claim 6 wherein the polyether segments of polyether urethane a) have a number average molecular weight of at least 6000 and the polyether segments of component b) have a number average molecular weight of 3000 to 12,000.

15. The polyether urethane of claim 7 wherein the polyether segments of polyether urethane a) have a number average molecular weight of at least 6000 and the polyether segments of component b) have a number average molecular weight of 3000 to 12,000.

16. The polyether urethane of claim 8 wherein the polyether segments of polyether urethane a) have a number average molecular weight of at least 6000 and the polyether segments of component b) have a number average molecular weight of 3000 to 12,000.

17. A sealant, adhesive or coating composition containing the moisture-curable, alkoxysilane-functional polyether urethane of claim 1.

\* \* \* \* \*